(12) United States Patent
Willis et al.

(10) Patent No.: US 11,913,317 B2
(45) Date of Patent: Feb. 27, 2024

(54) PROPPANTS PROCESSING SYSTEM AND METHOD

(71) Applicants: Colton Willis, Corpus Christi, TX (US); Jeremy Fontenot, Houston, TX (US)

(72) Inventors: Colton Willis, Corpus Christi, TX (US); Jeremy Fontenot, Houston, TX (US)

( * ) Notice: Subject to any disclaimer, the term of this patent is extended or adjusted under 35 U.S.C. 154(b) by 0 days.

(21) Appl. No.: 17/953,429

(22) Filed: Sep. 27, 2022

(65) Prior Publication Data

US 2023/0358125 A1  Nov. 9, 2023

Related U.S. Application Data (60) Provisional application No. 63/338,512, filed on May 5, 2022.

(51) Int. Cl.
  B65G 65/42 (2006.01)
  B65G 47/19 (2006.01)
  (Continued)

(52) U.S. Cl.
  CPC .......... E21B 43/2607 (2020.05); B65D 88/30 (2013.01); B65G 41/008 (2013.01);
  (Continued)

(58) Field of Classification Search
  CPC ... E21B 43/2607; E21B 43/267; B65D 88/30; B65G 41/008; B65G 47/1421; B65G 47/19; B65G 65/425; B65G 65/42; B65G 69/0425; B65G 2201/045; B65G 2814/0258
  (Continued)

(56) References Cited

U.S. PATENT DOCUMENTS 3,533,605 A 10/1970 Futty
8,585,341 B1 11/2013 Oren
(Continued)

OTHER PUBLICATIONS

WO 2017/078727 A1, Pal et al., May 11, 2017.*
US 2016/0031658 A1, Oren et al., Feb. 4, 2016.*
US 2021/0354910 A1, Grimes et al., Nov. 18, 2021.*

*Primary Examiner* — Douglas A Hess
(74) *Attorney, Agent, or Firm* — Brian K. Yost; Decker Jones, PC (57) ABSTRACT

The proppants processing system comprises one or more in-feed conveyors, one or more out-feed conveyors, one or more primary feed bin assemblies, one or more secondary bin assemblies, the primary and secondary bin assemblies each comprising one or more bins and one or more bin conveyors. The proppants processing system further comprises a final transport conveyor and a control unit adapted to control flow of the proppants. A method of processing proppants, the method comprising the steps of providing proppants comprising dry or wet sand; using an in-feed conveyor, transferring the proppants from a transport vehicle to one or more bins of a primary feed bin assembly; moving the proppants from the one or more bins to a feed bin conveyor; moving the proppants from the feed bin conveyor to a final transport conveyor; and using the final transport conveyor, moving the proppants to a blender.

16 Claims, 10 Drawing Sheets

(51) Int. Cl.
　　*B65D 88/30*　　(2006.01)
　　*E21B 43/26*　　(2006.01)
　　*E21B 43/267*　　(2006.01)
　　*B65G 47/14*　　(2006.01)
　　*B65G 69/04*　　(2006.01)
　　*B65G 41/00*　　(2006.01)

(52) U.S. Cl.
　　CPC ......... *B65G 47/1421* (2013.01); *B65G 47/19* (2013.01); *B65G 65/425* (2013.01); *B65G 69/0425* (2013.01); *E21B 43/267* (2013.01); *B65G 2201/045* (2013.01); *B65G 2814/0258* (2013.01)

(58) Field of Classification Search
　　USPC ....................................................... 198/540
　　See application file for complete search history.

(56) References Cited

U.S. PATENT DOCUMENTS

| | | | |
|---|---|---|---|
| 9,322,595 B1 * | 4/2016 | Shinn | F26B 25/002 |
| 9,340,353 B2 | 5/2016 | Oren | |
| 9,421,899 B2 | 8/2016 | Oren | |
| 9,676,554 B2 | 6/2017 | Glynn | |
| 9,744,537 B2 * | 8/2017 | Convery | B03B 9/02 |
| 9,771,224 B2 | 9/2017 | Oren | |
| 10,076,733 B2 | 9/2018 | Morris | |
| 10,300,830 B2 * | 5/2019 | McIver | B60P 1/6418 |
| 10,415,332 B2 | 9/2019 | Morris | |
| 10,518,229 B2 | 12/2019 | Morris | |
| 10,618,744 B2 | 4/2020 | Eiden | |
| 10,654,046 B2 * | 5/2020 | Moran | B24B 31/10 |
| 10,717,601 B2 * | 7/2020 | Kornelsen | B65G 15/24 |
| 10,914,155 B2 | 2/2021 | Oehring | |
| 10,994,646 B2 | 5/2021 | Lowe | |
| 11,364,507 B2 * | 6/2022 | Convery | B07B 15/00 |
| 11,446,614 B2 * | 9/2022 | Arceneaux | B01F 23/54 |
| 11,465,155 B1 * | 10/2022 | Mitchell | B07B 1/005 |
| 11,713,648 B2 * | 8/2023 | Oehler | B65G 65/42 |
| | | | 166/90.1 |
| 2012/0255734 A1 | 10/2012 | Coli | |
| 2014/0027386 A1 | 1/2014 | Munisteri | |
| 2016/0349728 A1 | 12/2016 | Oehring | |
| 2017/0259227 A1 | 9/2017 | Morris et al. | |
| 2020/0223346 A1 | 7/2020 | Welch | |

* cited by examiner

PROPPANTS PROCESSING SYSTEM AND METHOD

This application claims the benefit of U.S. provisional application No. 63/338,512 filed May 5, 2022, the contents of which are incorporated herein by reference.

BACKGROUND OF THE INVENTION

1. Field of the Invention

The present invention relates generally to a system and method of processing proppants such as sand and specifically to a system and method of processing wet proppants for use in hydraulic fracturing operations.

2. Description of the Prior Art

In conventional oil and gas operations, operators use hydraulic fracturing ("fracing" or "fracking") to release petroleum and natural gas from a hydrocarbon holding rock formation. High pressure injection of fluids and solids creates new channels in the formation, and thus, stimulates production. Some of the solids act a proppants. Proppants keep the fractures open so that hydrocarbons can be released. Operators generally attempt to pump as much volume as possible at or above the pressure necessary to frac the well using a sufficient amount of proppants to keep the fractures open.

The fluids of frac fluids comprise primarily water. Frac solids comprise primarily sand. Sand acts as a proppant. It is not unusual for 20,000,000 pounds of sand or more to be used while fracturing a single well. In conventional operations, frac sand is mined and processed at a location sometimes very far from the wellsite. Such processing involves washing, draining, drying, and screening the sand before transporting the sand. At or near the well site, the sand is stored in silos or other storage facilities. During a fracking operation, the sand is transported from the sand storage facility to a frac blender. The typical frac blender uses augers or "sand screws" to convey dry sand to mix with fluid. The operator mixes the sand with the water and other substances in the blender and creates a slurry. The slurry is then injected into the wellbore.

Drying sand off location and then mixing it with water at the wellsite is inefficient. It would be desirable to use sand that has not been dried prior to delivery to the wellsite.

Others have attempted to develop systems and methods of using sand that has not been dried prior to delivery to the drill site. For example, Morris et al. US pat. Pub No. 2017/0259227 provides a system which involves the use of surge tanks to liquefy wet sand. However, the system of Morris is not an efficient and economical solution to the problem.

What is needed is an efficient and cost effective system and method that permits wet sand to be delivered from an offsite facility to a location at or near the wellsite such that the wet sand can be used in hydraulic fracturing operations.

The present disclosure provides such as system and method.

SUMMARY OF THE INVENTION

By way of general overview, in various embodiments, the proppants processing system comprises one or more in-feed conveyors, one or more out-feed conveyors, one or more primary feed bin assemblies, one or more secondary feed bin assemblies, the primary and secondary feed bin assemblies each comprising one or more bins and one or more feed bin conveyors. The proppants processing system further comprises a final transport conveyor, a control unit, and an operation station. In preferred embodiments, the various conveyors comprise belts and motors.

In a first embodiment, the processing system comprises a single primary feed bin assembly comprising three bins; two in-feed conveyors and the final transport conveyor. Thus, in the first embodiment, the system does not comprise the secondary feed bin assembly. The proppants in this embodiment are moved directly from the primary feed bin assembly to, for example, a frac blender via a transport conveyor.

In the first embodiment as in other embodiments, the in-feed conveyor is used to transfer proppants received from transport trailers to the bins of the primary feed bin assembly. The preferred transport trailers are "live bottom" or "conveyor belt" trailers.

The bins of the primary feed bin assembly comprise a funnel-like configuration such that respective upper portions of the respective bins are wider than respective lower portions of the bins. The lower portions of the respective bins comprise a gate which can be selectively opened and closed such that a rate of flow of the proppants can be selectively controlled. In preferred embodiments, the primary feed bin assemblies comprise upper primary conveyors positioned below an outlet of each bin.

Vibration units positioned proximate to the respective bins are adapted, along with the gates, to be selectively controlled by an operator.

The vibration units and/or gates are operatively connected to the control unit which is communicatively linked to the operation station. In preferred embodiments, the primary feed bin assembly and secondary feed bin assembly comprise flow meters and/or scales/pressure transducers, or other conventional and commercially available devices and/or sensors adapted to detect, measure and/or calculate a rate of flow of material moving from the bins to the feed bin conveyors or the position/setting of the gates and vibration units, feed bin conveyors, and other components of the system.

In certain embodiments, dry sand can also be used instead of the wet sand.

In a second embodiment, the processing system comprises two primary feed bin assemblies, each comprising four bins; two in-feed conveyors and two out-feed conveyors, and two upper feed bin conveyors, two lower feed bin conveyors, and the secondary feed bin assembly. In the second embodiment, the secondary feed bin assembly consists of three bins.

In a third embodiment, the processing system comprises three primary feed bin assemblies, each comprising four bins; three in-feed conveyors and three out-feed conveyors. In this embodiment, one of the in-feed conveyors is a front-load in-feed conveyor.

In some embodiments, the front loading conveyor comprises wiper elements which are adapted to wipe the proppants off the side of the conveyor rather than an end.

In a fourth embodiment, the processing system comprises four primary feed bin assemblies, each comprising four bins; four in-feed conveyors and four out-feed conveyors. In this embodiment, each of the in-feed conveyors is a front-load in-feed conveyor.

In the fourth embodiment, the secondary feed bin assembly comprises four bins. In this embodiment, the final transport conveyor transfers the proppants to the frac blender. After the proppants are mixed with other slurry components in the frac blender, the mixture is conveyed to a filter system. In this embodiment, the filter system comprises one or more filter units, each of the filter units comprising one or more respective filter cages.

The filter units comprise a lower portion and an upper portion. Proximate to a rim of the lower portion is horizontal plate portion. The horizontal plate portion comprises plural through openings, each adapted to receive one of the filter cages. The filter cages are cylindrical and comprise a perimeter wall comprising a lattice or a honeycomb configuration comprising solid portions separated by spaces.

The lower and upper portions comprise cooperative coupling mechanisms which permit the upper portion to be removably and sealingly coupled with the lower portion.

The filter system is fluidly connected to the frac blender and a frac pump manifold of a frac pump such the filter system is fluidly in-between the frac blender and the frac pump manifold. As the mixture passes through each filter unit, larger particles are trapped by the filter cages creating a filtered mixture which is conveyed to the frac pump manifold.

The out-feed conveyors of the primary feed bin assemblies of the fourth embodiment are foldable and integrated within the primary feed bin assemblies. The out-feed conveyors of this embodiment comprises three sections hingedly attached to one another.

The primary feed bin assemblies of this and other embodiments are mobile units such that each is adapted to be transported over roads by, for example, a tractor trailer truck/semi.

In other embodiments, primary feed bin assemblies comprise a foldable in-feed conveyor mounted to, for example, the front of the feed bin assemblies.

In certain embodiments, the proppants processing system utilizes four-25 cubic yard four bin front loading primary feed bin assemblies (100 cubic yard total storage capacity~135 tons of dry sand) and one 25 cubic yard four bin secondary feed bin assembly with hydraulics adapted to lower the primary feed bin assembly and the final transport conveyor to the frac blender, and the downstream filter system.

In certain embodiments, the proppants processing system is street legal with an oversized escort.

A Method of Processing Proppants

In a first embodiment of the method of processing proppants such as sand, the method comprises the steps of providing proppants, such as wet sand; using an in-feed conveyor, transferring the proppants from a transport vehicle to one or more bins of a primary feed bin assembly; moving the sand from the one or more bins to a feed bin conveyor; moving the proppants from the feed bin conveyor to a final transport conveyor; using the final transport conveyor, moving the proppants to a frac blender.

In other embodiments of the method, after the step of moving the proppants from the one or more bins to a feed bin conveyor; the step of, using an out-feed conveyor, transferring the proppants to one or more bins of one or more secondary feed bin assemblies; moving the proppants onto a secondary feed bin conveyor; transferring the proppants to the final transport conveyor; and using the final transport conveyor, moving the proppants to a frac blender.

In other embodiments of the method, after the step of moving the proppants to the frac blender, the step of, using the frac blender, creating a mixture; moving the mixture from the frac blender to a filter system comprising a filter unit; using the filter unit, filtering the mixture to create a filtered mixture; moving the filtered mixture to a frac pump manifold.

In other embodiments of the method, vibration units are used to control the flow of proppants. In other embodiments of the method, the vibration units and/or gates are operatively connected to the control unit and are used to control the flow of proppants from the primary feed bin assembly to the final transport conveyor.

In other embodiments of the method, flow meters and/or scales/pressure transducers, are used to detect, measure and/or calculate a rate of flow of material moving from the bins to the feed bin conveyors or the position/setting of the gates and vibration units, feed bin conveyors and other components of the system.

In certain embodiments, the proppants are dry sand. In certain embodiments, the proppants are wet sand.

In other embodiments of the method, a front-load in-feed conveyor is provided.

In other embodiments of the method, primary feed bin assemblies comprising foldable and integrated out-feed conveyors positioned at respective rear ends of the primary feed bin assemblies are provided.

In other embodiments, primary feed bin assemblies comprising a foldable in-feed conveyor are provided.

In such embodiments, wiper elements are used to wipe the proppants off the side of the conveyor.

DESCRIPTION OF THE PREFERRED EMBODIMENT

Referring to FIG. 1-16, there is shown the wet proppants processing system 12 in accordance with preferred embodiments. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive. Throughout this disclosure the terms "feed bin" and "bin" refer to the same structure unless the context indicates otherwise.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention.

A Proppants Processing System

By way of general overview and referring to the figures, in various embodiments, the proppants processing system 12 comprises one or more in-feed conveyors 14, one or more out-feed conveyors 16, one or more primary feed bin assemblies 20, one or more secondary feed bin assemblies 26, the primary and secondary feed bin assemblies 20, 26 each comprising one or more bins 22 and one or more feed bin conveyors 24, 25, 27. In certain embodiments, the primary and secondary feed bin assemblies 20, 26 are substantially identical and contain like components, assemblies, and parts. In other embodiments, the primary and secondary feed bin assemblies 20, 26 comprise many of the same components or additional, or fewer components with respect to each other. For example, but not by way of limitation, the secondary feed bin assembly 26 may have a single feed bin conveyor 25 or dual feed bin conveyors 25, 27.

The proppants processing system 12 further comprises a final transport conveyor 28, a control unit 30, and an operation station 32. In preferred embodiments, the various conveyors comprise belts 46 and motors 37. Although many embodiments comprise like components, systems, and assemblies, the following is a discussion of various embodiments. Although specific embodiments may be discussed, as mentioned, the particular features, structures, or characteristics may be combined in any suitable manner on one or more embodiments without limitation. Therefore, when a specific embodiment is discussed in this disclosure, references may be made to elements and figures of different embodiments that share common elements with the specific embodiment being discussed. The figures are intended to assist in reading and understanding this disclosure. However, because of space limitations and for purposes of clarity, all components of the various embodiments are not shown in all figures. Therefore, although certain components may be only shown in certain figures, such components may also appear in other embodiments or in other locations of the same embodiment.

A First Embodiment

Figure 3:
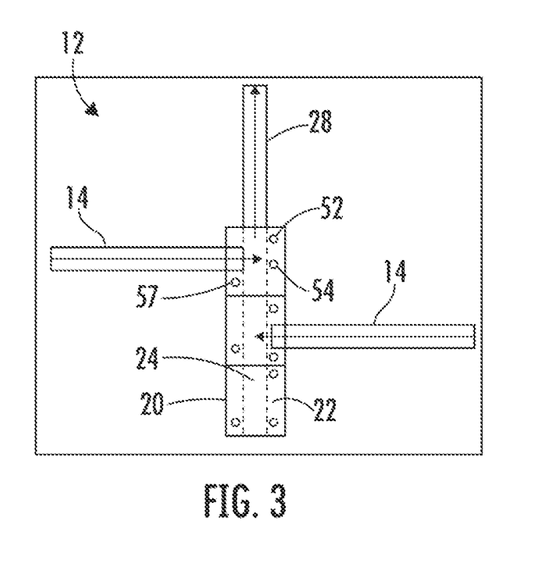
FIG. 3 is a conceptual plan view of portions of the proppants processing system of FIG. 1.

Referring to FIG. 3, in a first embodiment, the processing system 12 comprises a single primary feed bin assembly 20 comprising three bins 22; two in-feed conveyors 14 and the final transport conveyor 28. Thus, in the first embodiment, the system 12 does not comprise the secondary feed bin assembly 26. The proppants 18 in this embodiment is moved directly from the primary feed bin assembly 20 to, for example, a frac blender 36.

Figure 13:
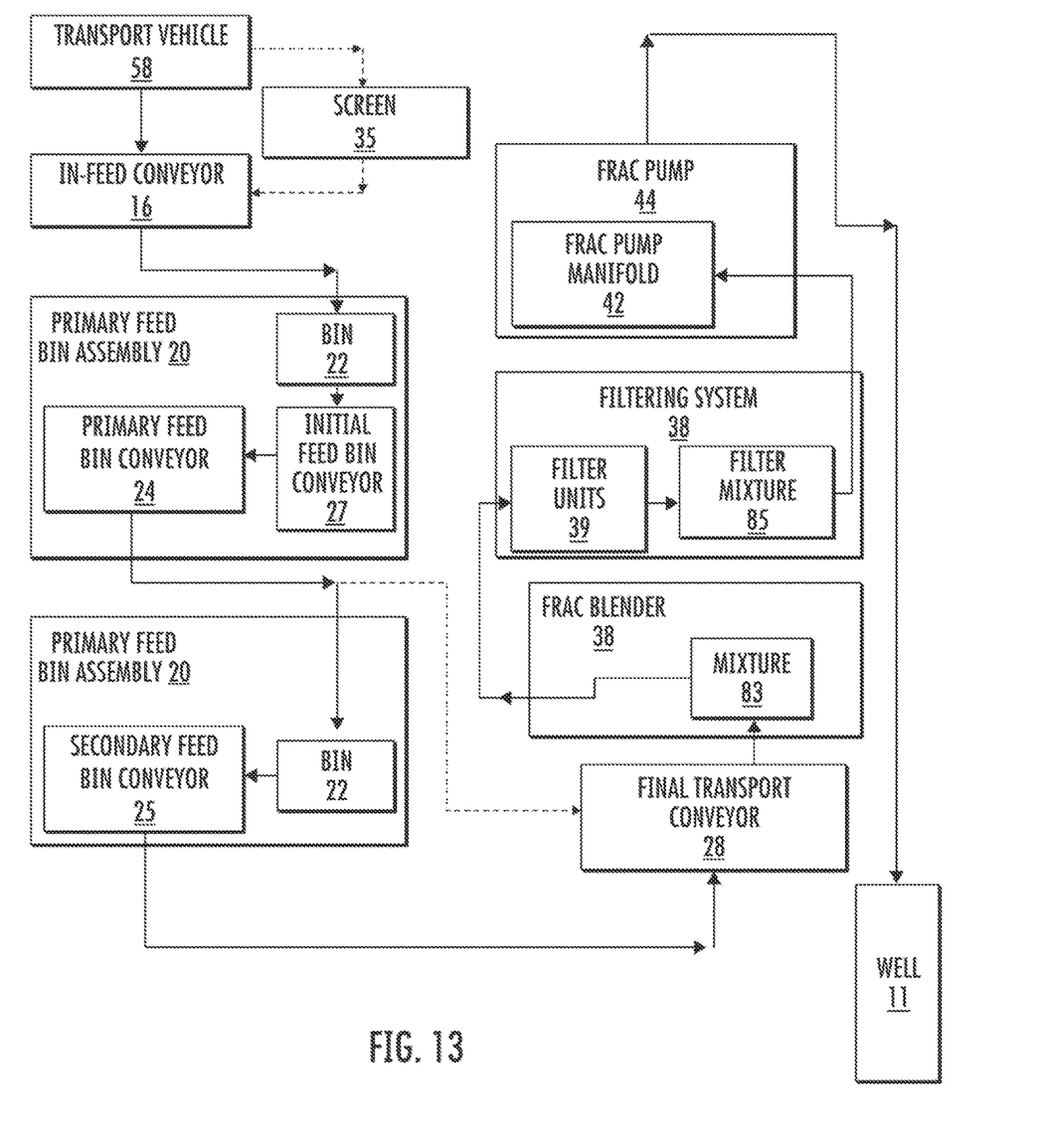
FIG. 13 is a block diagram of the system and method in accordance with a preferred embodiment.

In the first embodiment as in other embodiments, the in-feed conveyor 14 is used to transfer proppants 18 received from transport trailers 58 to the bins 22 of the primary feed bin assembly 20. The preferred transport trailers 58 are "live bottom" or "conveyor belt" trailers. Conventional live bottom trailers 58 comprise a trailer conveyor belt positioned proximate to a lower portion of the trailer's tub. The trailer conveyor belt moves material out of the back of the trailer 58. Use of the live bottom trailers 58 keeps the proppants 18 from becoming contaminated during transport from the mining/processing location to the wellsite and during transport from the live bottom trailer 58 to the in-feed conveyor 14. In some variations of this embodiment and others, the proppants 18 are off-loaded from the live bottom trailer 58 to an open or covered onsite storage area. In some variations, the proppants 18 are screened during offloading such that, for example, the proppants 18 are filtered through a screen 35 such as a sieve or grate such that smaller particles pass through the screen and larger particles do not (FIG. 13).

Figure 6:
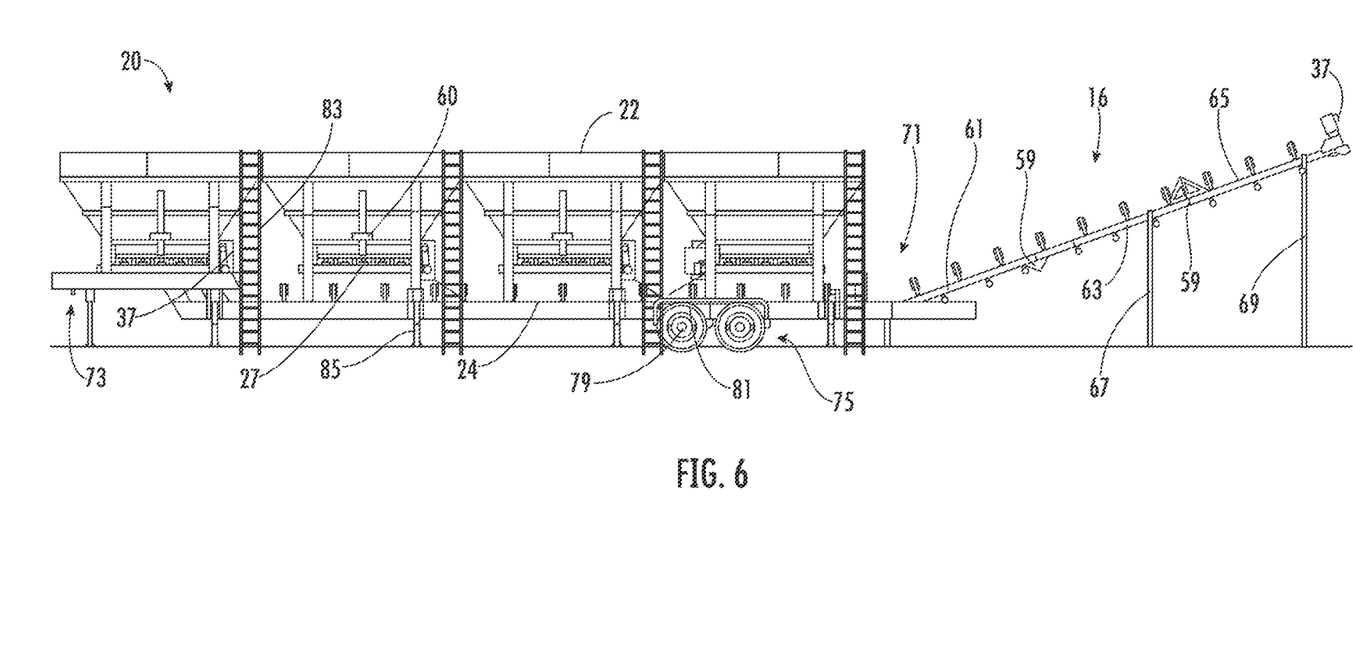
FIG. 6 is a left-side elevation view of a bin conveyor assembly of the proppants processing system, the bin conveyor assembly depicted in a deployed condition.
Figure 7:
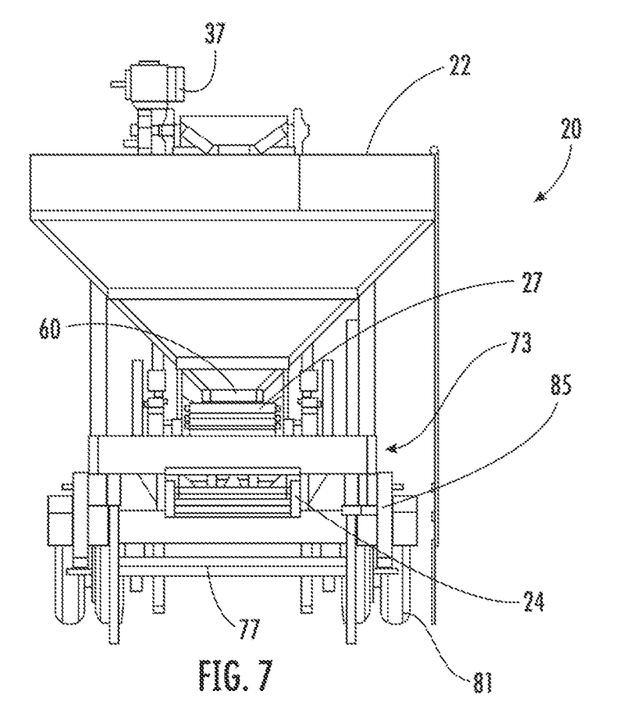
FIG. 7 is a front elevation view of the bin conveyor assembly of FIG. 6.

As shown for example, in FIG. 6, the bins 22 of the primary feed bin assembly 20 comprise a funnel-like configuration such that respective upper portions 48 of the respective bins 22 are wider (have a greater circumference and/or diameter) than respective lower portions 50 of the bins 22. The lower portions of the respective bins 22 comprise a gate 60 which can be selectively opened and closed such that a rate of flow of the proppants 18 can be selectively controlled. In preferred embodiments, the primary feed bin assemblies 20 comprise upper primary conveyors 27 positioned below an outlet of each bin 22. The upper primary conveyors 27 transport proppants 18 to the lower conveyor 24, 25 which travels beneath each of the upper primary conveyors 27.

Referring to FIG. 6, because the proppants 18, for example, may be wet, in the first embodiment and others, vibration units 52 positioned proximate to the respective bins 22 are adapted, along with the gates 60, to be selectively controlled by an operator. This arrangement permits the operator to control the flow of proppants 18 from the primary feed bin assembly 20 to the final transport conveyor 28.

Figure 1:
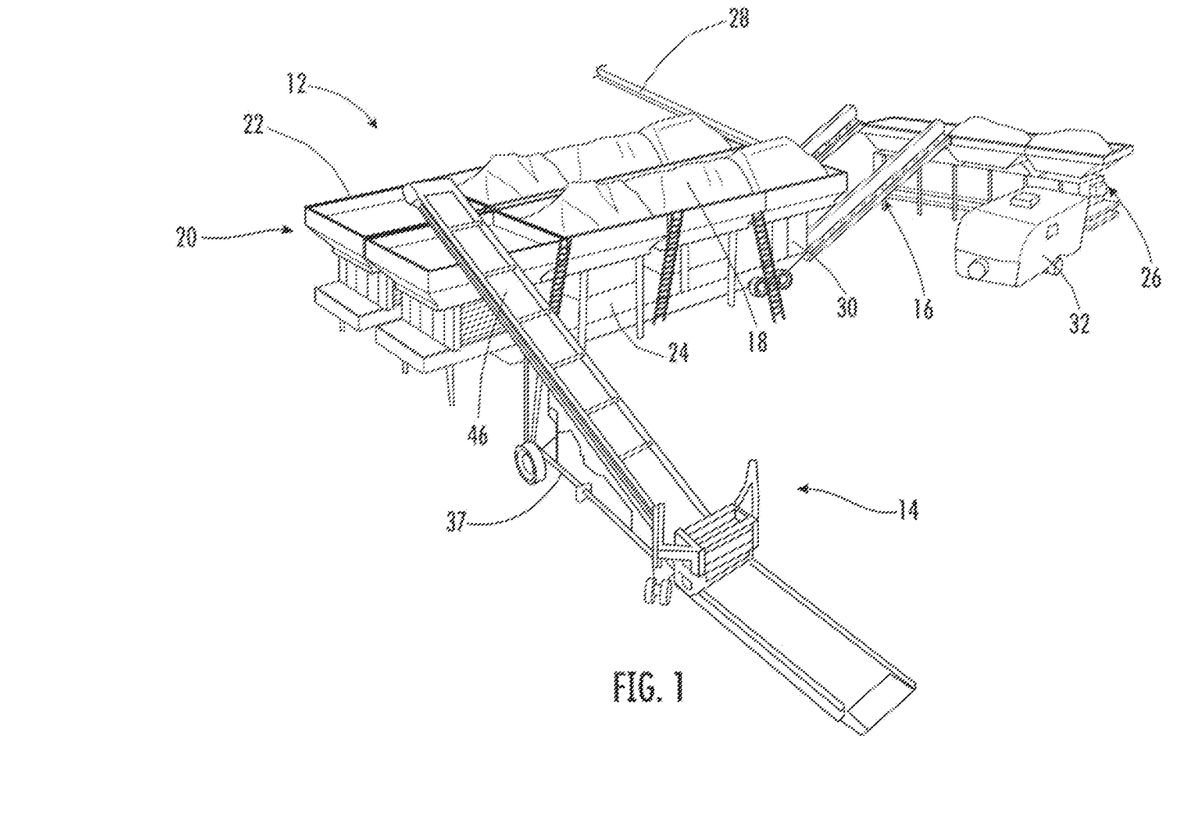
FIG. 1 is an isometric front and side view of the proppants processing system, in accordance with a preferred embodiment.
Figure 2:
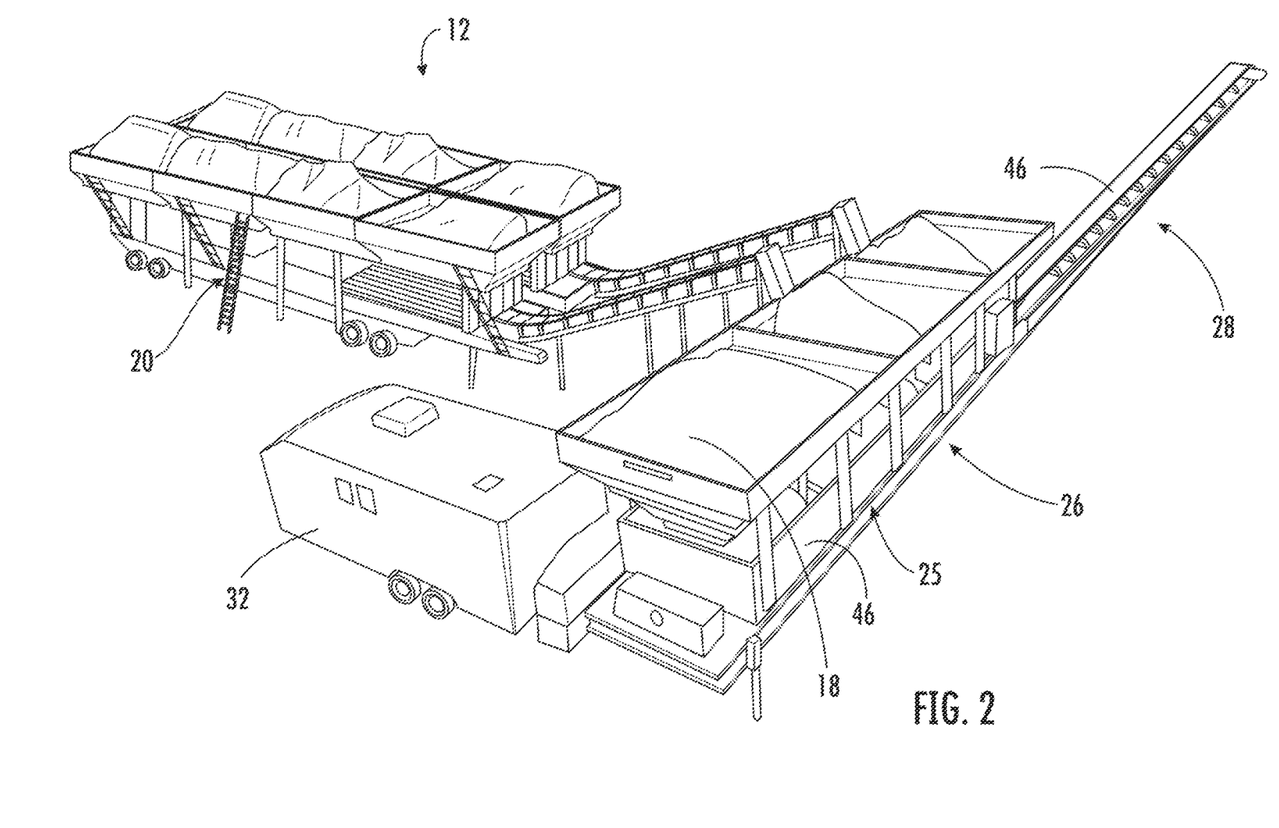
FIG. 2 is an isometric rear and side view of the proppants processing system of FIG. 1.

The vibration units 52 and/or gates 60 are operatively connected to the control unit 30 which is communicatively linked to the operation station 32 (FIG. 1). In preferred embodiments, the primary feed bin assembly 20 and secondary feed bin assembly 26 comprises flow meters 54 and/or scales/pressure transducers 57, or other conventional and commercially available devices and/or sensors adapted to detect, measure and/or calculate a rate of flow of material moving from the bins 22 to the feed bin conveyors 24, 25, 27 or the position/setting of the gates 60 and vibration units 52, feed bin conveyors 24, 25, 27, and other components of the system 12. Thus, for example, if the rate of flow of proppants 18 begins to decrease because the proppants 18 are sticking to sides of the bin 22, an operator can activate the vibration units 52 from the operation station 32.

The control of the vibration units 52, gates 60, feed bin conveyors 24, 25, 27 and other components of the system 12 comprise conventional actuators or other devices that permit remote mechanical operation of the various components. Such control can be discrete incremental or continuous incremental, such that the component, can, for example, move from set predetermined positions within a range or any position within the range.

The final transport conveyor 28 transfers the proppants 18 to the frac blender 36. The frac blender 36 is a machine, usually vehicle or trailer mounted, in which the proppants 18, water, and other substances are mixed together to form a slurry adapted to be injected into the well 11 to cause the fracturing of the well formation.

In certain embodiments, dry sand 18 can also be transported from, for example, silos to be used instead of the wet sand 18.

A Second Embodiment

Figure 4:
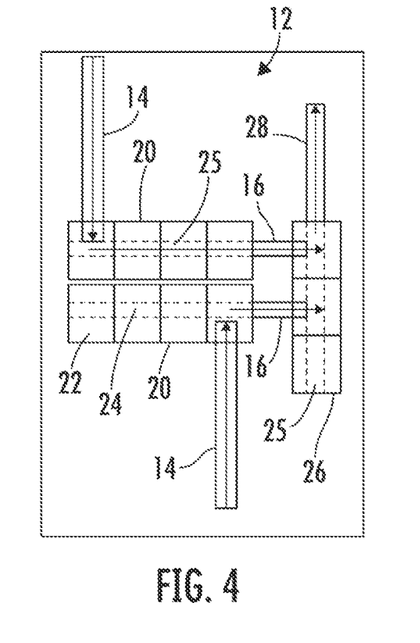
FIG. 4 is a conceptual plan view of portions of the proppants processing system in accordance with another embodiment.

Referring to FIG. 4, in a second embodiment, the processing system 12 comprises two primary feed bin assemblies 20, each comprising four bins 22 (eight total); two in-feed conveyors 14 and two out-feed conveyors 16, and two feed bin conveyors 24, and the secondary feed bin assembly 26. In the second embodiment, the secondary feed bin assembly 26 consists of three bins 22. The proppants 18 are transported by the respective feed bin conveyors 24 to the respective out-feed conveyors 16 which lead to the secondary feed bin assembly 26. The secondary feed bin conveyor 25 receives the proppants 18 from the secondary feed bin assembly 26. The final transport conveyor 28 transfers the proppants 18 from the secondary feed bin conveyor 25.

The bins 22 of the secondary feed bin assembly 26 also comprise a funnel-like configuration such that respective upper portions 48 of the respective bins 22 are wider than respective lower portions 50 of the bins 22. In preferred embodiments, the secondary feed bin assemblies 26 comprise upper secondary conveyors 27 positioned below an outlet of each bin 22. The upper secondary conveyors 27 transport proppants 18 to the lower conveyor 24, 25 which travels beneath each of the respective upper secondary conveyors 27. The lower portions of the respective bins 22 of the secondary feed bin assembly 26 also comprise respective gates 60 which can be selectively opened and closed such that a rate of flow of the proppants 18 can be selectively controlled.

As with the primary bin assembly 20, the secondary feed bin assembly 26 comprises vibration units 52 which are adapted, along with the gates 60, and other components to be selectively controlled by the operator. In the second embodiment and others, this arrangement permits the operator to control the flow of proppants 18 from the primary feed bin assembly 20 to the secondary feed bin assembly 26 and/or control the flow of proppants 18 from the secondary feed bin assembly 26 to the final transport conveyor 28.

In the second embodiment and others, in addition to those in the primary feed bin assembly 20, the secondary feed bin assembly 26 comprises flow meters 54 and/or scales/transducers 57 or other conventional and commercially available devices and/or sensors adapted to detect, measure and/or calculate a rate of flow of material moving from the bins 22 of the secondary feed bin assembly 26 to the secondary feed bin conveyor 25 or the position/setting of the gates 60 and vibration units 52 of the secondary feed bin assembly 26.

A Third Embodiment

Figure 5:
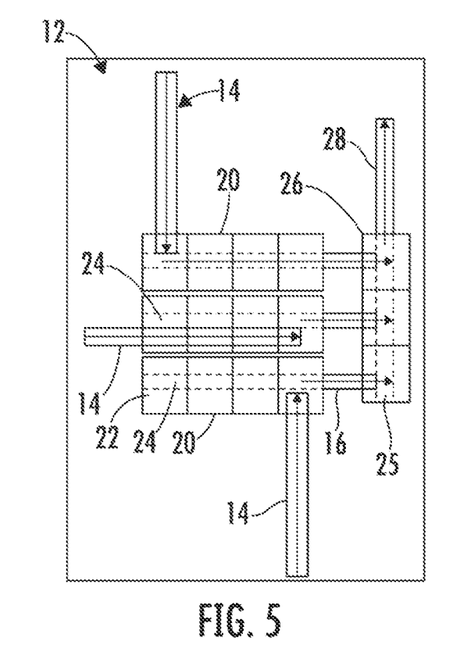
FIG. 5 is a conceptual plan view of portions of the proppants processing system in accordance with another embodiment.

Referring to FIG. 5, in a third embodiment, the processing system 12 comprises three primary feed bin assemblies 20, each comprising four bins 22 (twelve total); three in-feed conveyors 14 and three out-feed conveyors 16. In this embodiment, one of the in-feed conveyors 14 is a front-load in-feed conveyor. This arrangement permits the middle-most primary feed bin assemblies 20 to readily receive proppants 18 while the outside primary feed bin assemblies 20 receive proppants from the respective sides. In some embodiments, the front loading in-feed conveyor 14 comprises wiper elements which are adapted to wipe the proppants 18 off the side of the conveyor 14 rather than an end.

A Fourth Embodiment

Referring to FIG. 10-13, in a fourth embodiment, the processing system 12 comprises four primary feed bin assemblies 20, each comprising four bins 22 (sixteen total); four in-feed conveyors 14 and four out-feed conveyors 16. In this embodiment, each of the in-feed conveyors 14 is a front-load in-feed conveyor 14.

Figure 10:
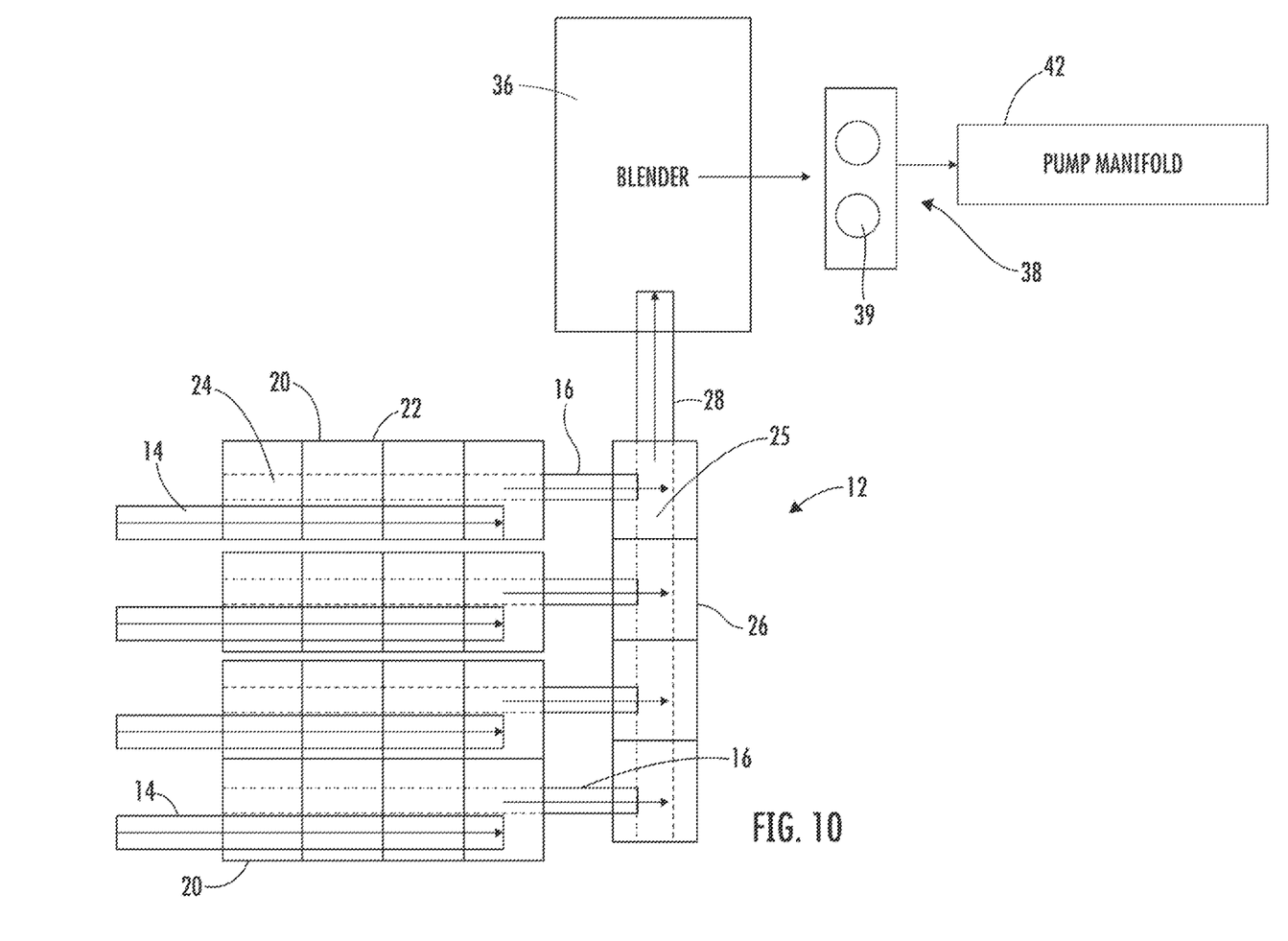
FIG. 10 is conceptual plan view of portions of the proppants processing system, in accordance with another preferred embodiment.
Figure 11:
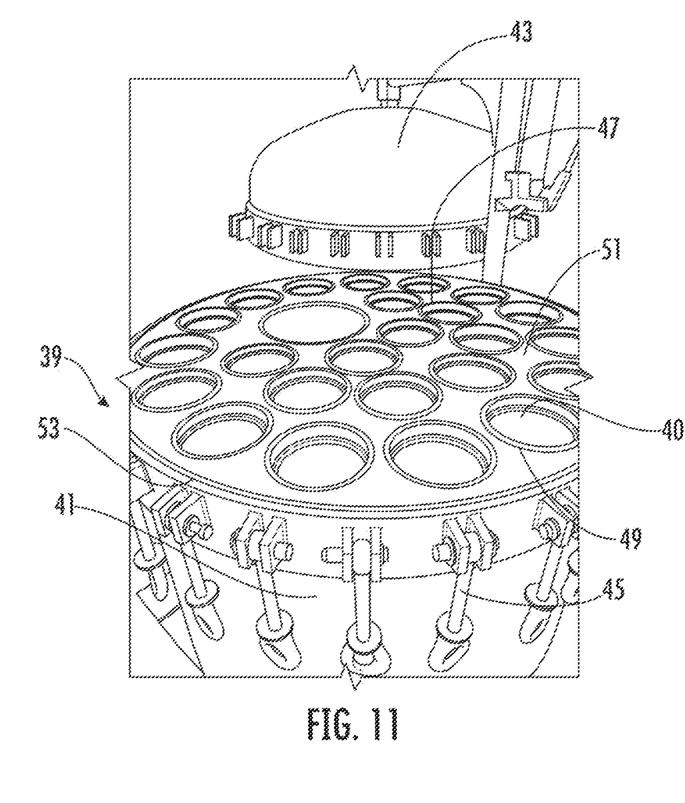
FIG. 11 is an isometric view of the debris catcher assembly of FIG. 10.
Figure 12:
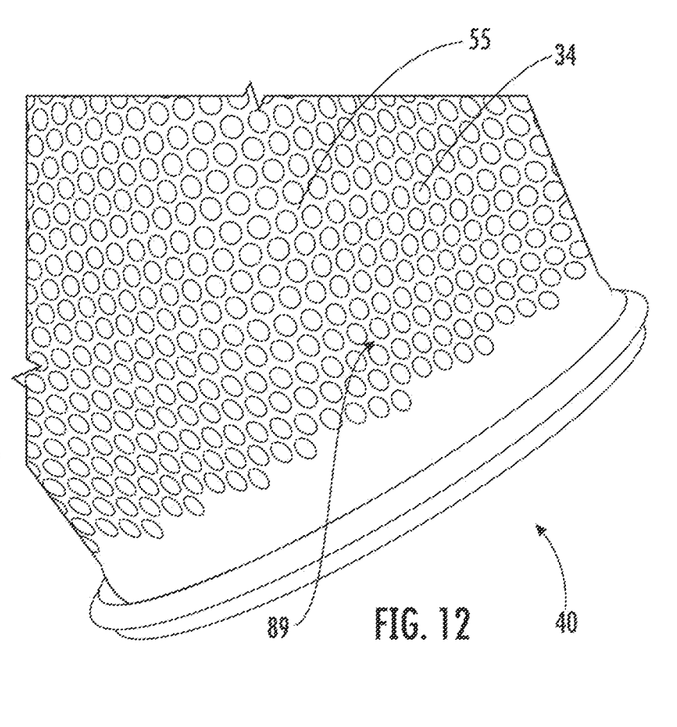
FIG. 12 is an isometric view of the filter cage of the debris catcher assembly of FIG. 11.

In the fourth embodiment, the secondary feed bin assembly 26 comprises four bins 22. In this embodiment, the final transport conveyor 28 transfers the proppants 18 to the frac blender 36. Referring to FIGS. 10 & 13, after the proppants 18 are mixed with other slurry components in the frac blender 36, the mixture 83 is conveyed to a filter system 38. In this embodiment, the filter system 38 comprises one or more filter units 39, each of the filter units 39 comprising one or more respective filter cages 40 (FIGS. 11 & 12).

The respective filter units 39 can be in arranged in series or in parallel. The filter units 39 comprise a lower portion 41 and an upper portion 43. Proximate to a rim 53 of the lower portion 41 is horizontal plate portion 51. The horizontal plate portion 51 comprises plural through openings 49, each adapted to receive one of the filter cages 40. The through openings 49 of the preferred embodiment are circular. The filter cages 40 are cylindrical and comprise a perimeter wall 89 comprising a lattice or a honeycomb configuration comprising solid portions 55 separated by spaces 34.

The lower and upper portions 41, 43 comprise cooperative coupling mechanisms 45, 47 which permit the upper portion 43 to be removably and sealingly coupled with the lower portion 41. In the preferred embodiment, the cooperative coupling mechanisms 45, 47 comprise a perimeter latching arrangement comprising plural lower arms 45 hingedly connected to the lower portion 41 and corresponding receiver portions 47 connected to the upper portion 43. To close the filter unit 39, the upper portion 43 is positioned atop the lower portion 41 and the respective arms are pivoted upward to a position within the respective receiver portions 47.

Referring to FIGS. 10 & 13, the filter system 38 is fluidly connected to the frac blender 36 and a frac pump manifold 42 of a frac pump 44 such the filter system 38 is fluidly in-between the frac blender 36 and the frac pump manifold 42. The mixture 83 is received by the filter system 38. As the mixture 83 passes through each filter unit 39, larger particles are trapped by the filter cages creating a filtered mixture 85. The filtered mixture 85 is conveyed to the frac pump manifold 42. Although the filter system 38 of the preferred embodiment receives the mixture 83 which contains, among other materials, water, the filter system 38 is adapted to process dry mixtures 83 as well. Whether, wet or dry, the filter system 38 filters out trash and other unwanted debris from the mixture 83 which helps prevent damage to the frac pump and/or prevents the trash and debris from entering the well 11.

Figure 8:
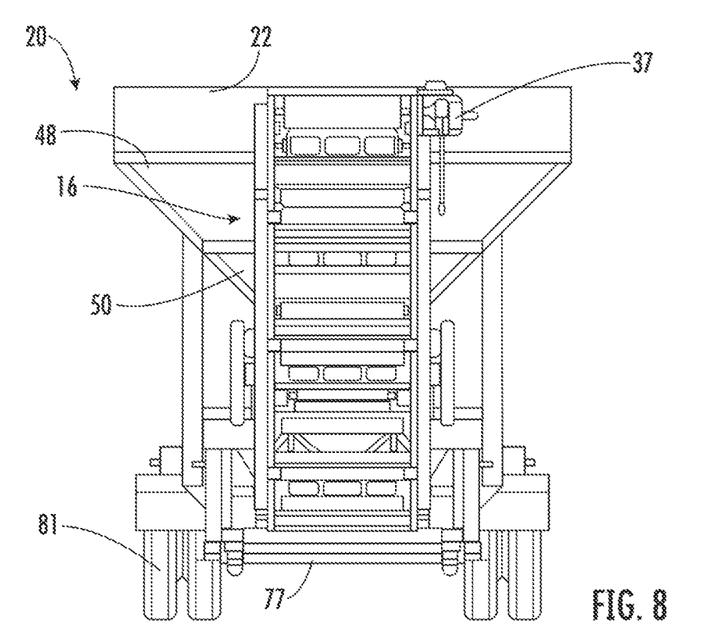
FIG. 8 is a rear elevation view of the bin conveyor assembly of FIG. 9.
Figure 9:
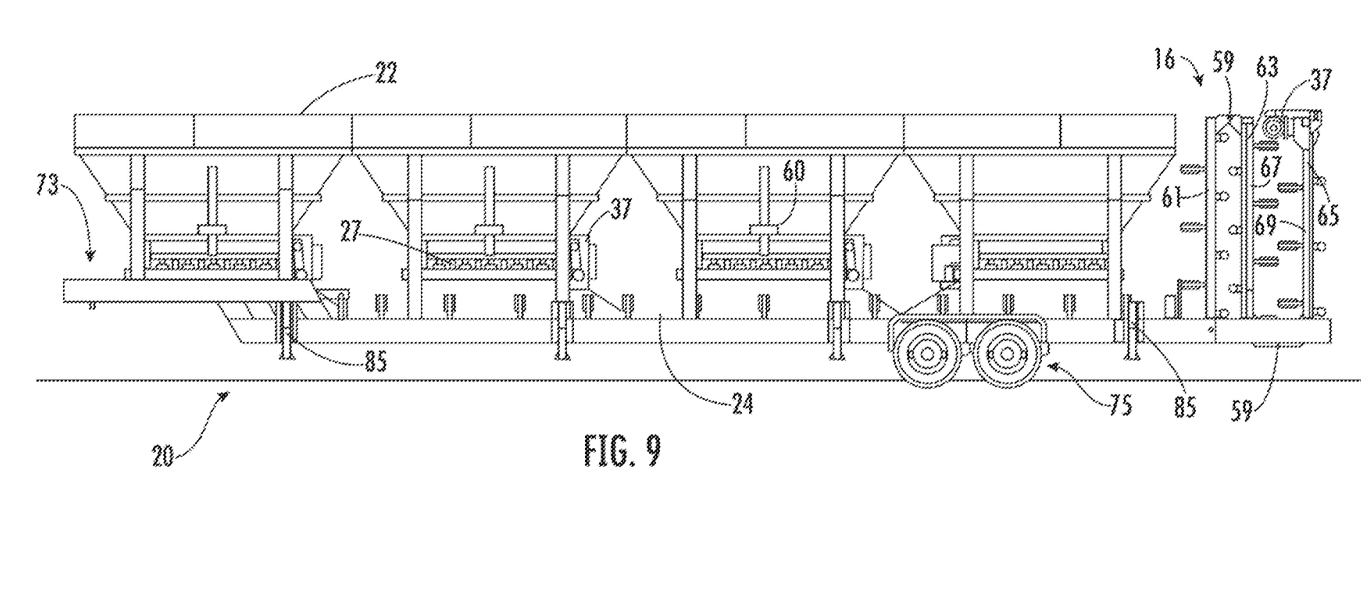
FIG. 9 is a left-side elevation view of the bin conveyor assembly in a transport condition.

Referring to FIGS. 6-12, the out-feed conveyors 16 of the primary feed bin assemblies 20 of the fourth embodiment are foldable and integrated within the primary feed bin assemblies 20. The out-feed conveyors 16 of this embodiment are positioned at respective rear ends 71 of the primary feed bin assemblies 20. FIG. 6 depicts the out-feed conveyors 16 in deployed condition. FIGS. 8 and 9 depict the out-feed conveyors 16 in a transport condition. The out-feed conveyors 16 of this embodiment comprises three sections 61, 63, 65 hingedly attached to one another by hinges 59. First and second pairs of legs 67, 69 are foldingly coupled to one or more of the sections 61, 63, 65.

The primary feed bin assemblies 20 of this and other embodiments are mobile units such that each is adapted to be transported over roads by, for example, a tractor trailer truck/semi. A front end 73 of the primary feed bin assemblies 20 comprises a fifth wheel attachment portion 75 which the transport vehicle can connect to. A rear suspension system 75 of the preferred embodiment comprises an axle assembly 77, wheels 79, and tires 81 structured and arranged to permit the wheels 79 and tires 81 to rotate about the axle assembly 77.

The primary feed bin assemblies 20 of this and other embodiments also comprise one or more ladders 83 and support mechanisms 85. The support mechanisms 85 of this embodiment comprise a telescoping arrangement and provide stability to the primary feed bin assemblies 20 when in, for example, the deployed condition depicted in FIG. 6.

OTHER EMBODIMENTS

Figure 14:
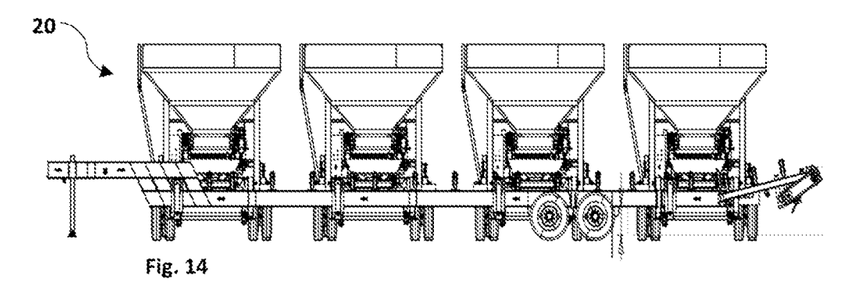
FIG. 14 is an end elevation view of the primary and secondary assemblies in accordance with another preferred embodiment.
Figures 15, 16:
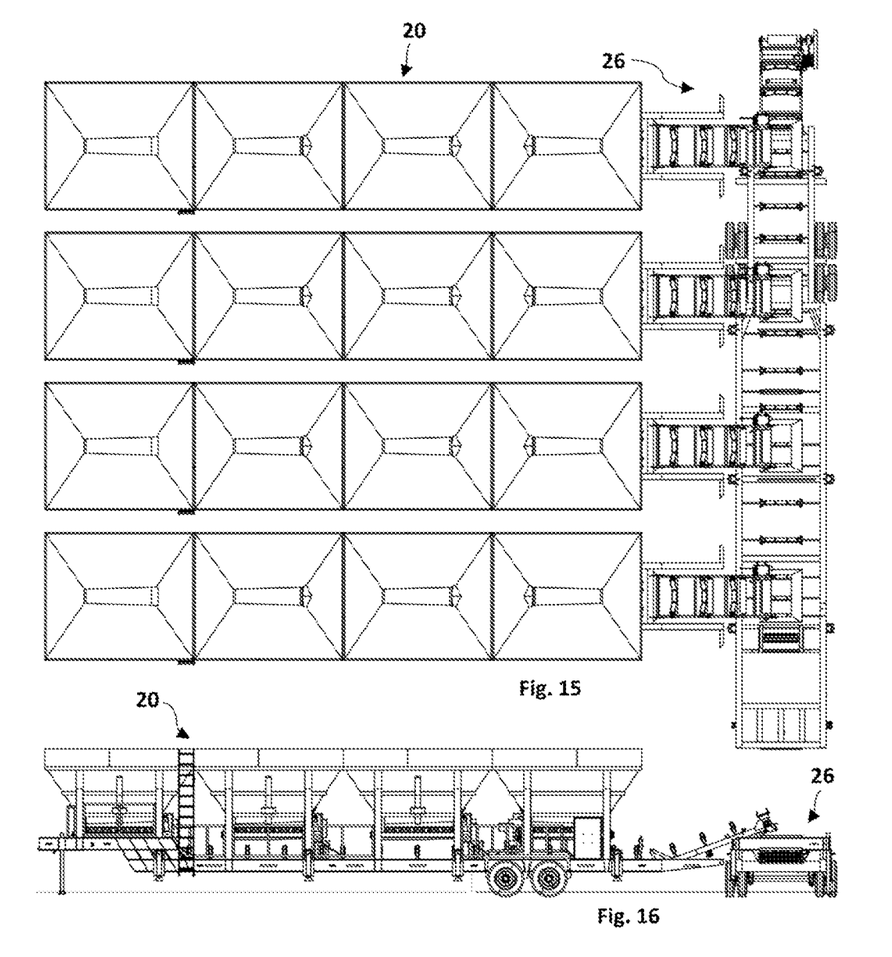
FIG. 15 is a plan view of the primary and secondary assemblies of FIG. 14.
FIG. 16 is a side elevation view of the primary and secondary assemblies of FIG. 14.

Referring to FIG. 14-16, in other embodiments, of the proppants processing system 12, the In certain embodiments, the primary and secondary feed bin assemblies 20, 26 have the arrangements shown in FIGS. 14-16. In such embodiments, the secondary bin assembly 26 has a much shorter profile than the primary bin assembly 20. The bins 22 of the secondary bin assembly 26 of this embodiment are smaller than in other embodiments.

In other embodiments, one or more feed bin conveyors 24, 25, 27 comprise a telescopic arrangement such that a telescoping belt can be adjusted and moved, as necessary, to fill the bins 22, from example, a single offload point. A conventional and commercially available arrangement of such a telescopic belt conveyor is branded under the mark Telebelt® model TBS 130. By way of further example, in certain embodiments, belly dump trailers may be used to offload to a single telescoping belt that transports proppants 18 to the bins 22.

In other embodiments, primary feed bin assemblies 20 comprise a foldable in-feed conveyor 14 mounted to, for example, the front of the feed bin assemblies 20. Such in-feed conveyor 14 is similar to that of the foldable out-feed conveyor 16 except that it would extend from a top portion of the bins 22 downward to the loading vehicle 58 or proppants 18 supply. In such embodiments, the foldable in-feed conveyor 14 comprises wiper elements which are adapted to wipe the proppants off the side of the conveyor 14 rather than an end.

In certain embodiments, the proppants processing system 12 is adapted to deliver independently to each storage bin 22.

In certain embodiments, the proppants processing system 12 repurposed aggregate conveyor equipment is used for onsite storage of the proppants 18. In such embodiments, equipment stores the proppants 18 above ground in self-contained conveyor systems.

In certain embodiments, the proppants processing system 12 utilizes four-25 cubic yard four bin 22 front loading primary feed bin assemblies 20 (100 cubic yard total storage capacity 135 tons of dry sand) and one 25 cubic yard four bin 22 secondary feed bin assembly 26 with hydraulics adapted to lower the primary feed bin assembly 20 and the final transport conveyor 28 to the frac blender 36, and the downstream filter system 38.

In certain embodiments, the proppants processing system 12 is street legal with an oversized escort.

A Method of Processing Proppants

Referring to FIG. 13, in a first embodiment of the method of processing proppants 18, the method comprises the steps of providing proppants 18; using an in-feed conveyor 14, transferring the proppants 18 from a transport vehicle to one or more bins 22 of a primary feed bin assembly moving the proppants 18 from the one or more bins 22 to a feed bin conveyor 24; moving the proppants from the feed bin conveyor 24 to a final transport conveyor 28; using the final transport conveyor 28, moving the proppants to a frac blender 36. In embodiments of the method, the proppants 18 are wet sand or dry sand.

In other embodiments of the method, after the step of moving the proppants 18 from the one or more bins 22 to a feed bin conveyor 24; the step of, using an out-feed conveyor 16, transferring the proppants 18 to one or more bins 22 of one or more secondary feed bin assemblies 26; moving the proppants onto a secondary feed bin conveyor 24; transferring the proppants 18 to the final transport conveyor 28; and using the final transport conveyor 28, moving the proppants to a frac blender 36.

In other embodiments of the method, after the step of moving the proppants 18 to the frac blender 36, the step of, using the frac blender 36, creating a mixture 83; moving the mixture 83 from the frac blender 36 to a filter system 38 comprising a filter unit 39; using the filter unit 39, filtering the mixture 83 to create a filtered mixture 85; moving the filtered mixture 85 to a frac pump manifold 42.

In other embodiments of the method, a single primary feed bin assembly 20 comprising three bins 22; two in-feed conveyors 14 and the final transport conveyor 28 are provided and a secondary feed bin assembly 26 is not used. The proppants 18 in this embodiment are moved directly from the primary feed bin assembly 20.

In other embodiments of the method, "live bottom" or "conveyor belt" transport trailers are provided to provide the proppants 18.

In some variations of the method, the proppants 18 are off-loaded from the live bottom trailer 58 to an open or covered onsite storage area. In some variations, the proppants 18 are screened during offloading.

In other embodiments of the method, vibration units 52 positioned proximate to the respective bins 22 are used to control the flow of proppants 18 from the primary feed bin assembly 20 to the final transport conveyor 28.

In other embodiments of the method, the vibration units 52 and/or gates 60 are operatively connected to the control unit 30 and are used to control the flow of proppants 18 from the primary feed bin assembly 20 to the final transport conveyor 28.

In other embodiments of the method, flow meters 54 and/or scales/pressure transducers 57, are used to detect, measure and/or calculate a rate of flow of material moving from the bins 22 to the feed bin conveyors 24, 25, 27 or the position/setting of the gates 60 and vibration units 52, feed bin conveyors 24, 25, 27, and other components of the system 12.

In other embodiments of the method, two primary feed bin assemblies 20, each comprising four bins 22 (eight total); two in-feed conveyors 14 and two out-feed conveyors 16, and two feed bin conveyors 24, and the secondary feed bin assembly 26 are provided.

In other embodiments of the method, the secondary feed bin conveyor 25 receives the proppants 18 from the secondary feed bin assembly 26 and the final transport conveyor 28 transfers the proppants 18 from the secondary feed bin conveyor 25.

In other embodiments of the method, three primary feed bin assemblies 20, each comprising four bins 22 (twelve total); three in-feed conveyors 14 and three out-feed conveyors 16 are provided.

In other embodiments of the method, a front-load in-feed conveyor 14 is provided.

In other embodiments of the method, four primary feed bin assemblies 20, each comprising four bins 22 (sixteen total); four in-feed conveyors 14 and four out-feed conveyors 16 are provided.

In other embodiments of the method, a secondary feed bin assembly 26 comprising four bins 22 is provided.

In other embodiments of the method, a filter system 38 comprising one or more filter units 39, each of the filter units 39 comprising one or more respective filter cages 40 is provided.

In other embodiments of the method, the mixture is a dry mixtures 83.

In other embodiments of the method, primary feed bin assemblies 20 comprising foldable and integrated out-feed conveyors 16 positioned at respective rear ends 71 of the primary feed bin assemblies 20 are provided.

In other embodiments, primary feed bin assemblies 20 comprising a foldable in-feed conveyor 14 are provided.

In such embodiments, wiper elements are used to wipe the proppants 18 off the side of the conveyor.

DISCLOSURE NOT TO BE LIMITED

While there has been illustrated and described what is, at present, considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of this disclosure.

The invention claimed is:

1. A proppants processing system comprising:
    an in-feed conveyor, an out-feed conveyor, a primary bin assembly, a secondary bin assembly, and a final transport conveyor;
    the primary bin assembly comprising one or more primary bins, one or more upper primary bin conveyors, and one or more lower primary bin conveyors;
    the respective one or more upper primary bin conveyors being positioned below the respective primary bins;
    the one or more lower primary bin conveyors being positioned below the respective upper primary bin conveyors;
    the respective upper primary bin conveyors being adapted to receive the proppants from the respective primary bins;
    the respective lower primary bin conveyors being adapted to receive proppants from the respective upper primary bin conveyors;
    the secondary bin assembly comprising one or more secondary bins, one or more upper secondary bin conveyors, and one or more lower secondary bin conveyors;
    the respective one or more upper secondary bin conveyors being positioned below the respective secondary bins;
    the one or more lower secondary bin conveyors being positioned below the respective upper secondary bin conveyors;
    the respective upper secondary bin conveyors being adapted to receive the proppants from the respective secondary bins;
    the respective lower secondary bin conveyors being adapted to receive proppants from the respective upper secondary bin conveyors;
    the in-feed conveyor being adapted to transport proppants to the primary bin assembly;
    the out-feed conveyor being adapted to transport proppants from the primary bin assembly to the secondary bin assembly;
    the final transport conveyor being adapted to transport proppants from the secondary bin assembly.

2. The proppants processing system of claim 1, wherein lower portions of the respective bins comprise respective gates which can be selectively controlled.

3. The proppants processing system of claim 2, the system further comprising vibration units positioned proximate to one or more of the respective bins.

4. The proppants processing system of claim 3, wherein the vibration units and gates are operatively connected to a control unit structured and arranged to selectively control a rate of flow of the proppants.

5. The proppants processing system of claim 1, the final transport conveyor structured and arranged to convey the proppants to a blender, the blender adapted to mix the proppants with slurry components to create a blended slurry mixture.

6. The proppants processing system of claim 5, further comprising a filter system fluidly connected to the blender, the filter system comprising one or more filter units, each of the filter units comprising one or more respective filter cages, the filter system being adapted to receive and filter the blended slurry mixture.

7. The proppants processing system of claim 1, wherein the proppants comprise wet sand.

8. The proppants processing system of claim 1, wherein the proppants comprise dry sand.

9. The proppants processing system of claim 1, the primary bin assembly being a first primary bin assembly, the processing system further comprising a second primary bin assembly.

10. The proppants processing system of claim 9, the first and second primary bin assemblies each comprising at least two bins.

11. The proppants processing system of claim 10, wherein the in-feed conveyor is a front-load in-feed conveyor.

12. The proppants processing system of claim 1, the out-feed conveyor being foldable and integrated within the primary bin assembly.

13. The proppants processing system of claim 1, the primary feed bin assembly being a mobile unit, structured and arranged such that it is adapted to be transported over roads.

14. A method of processing proppants, the method comprising the steps of:
   providing proppants comprising dry or wet sand;
   using an in-feed conveyor, transferring the proppants from a transport vehicle to one or more bins of a primary feed bin assembly;
   moving the proppants from the one or more bins to an upper bin conveyor;
   moving the proppants from the upper bin conveyor to a lower bin conveyor;
   using an out-feed conveyor, transferring the proppants to one or more bins of one or more secondary feed bin assemblies;
   moving the proppants to a secondary bin conveyor;
   moving the proppants from the secondary bin conveyor to a final transport conveyor;
   using the final transport conveyor, moving the proppants to a blender.

15. The method of processing proppants of claim 14, after the step of moving the proppants to the blender, the steps of:
   using the blender, creating a blended slurry mixture;
   moving the blended slurry mixture from the blender to a filter system comprising a filter unit;
   using the filter unit, filtering the blended slurry mixture to create a filtered mixture;
   moving the filtered mixture to a frac pump manifold.

16. The method of processing proppants of claim 15, wherein vibration units and gates are used to control the flow of proppants from the primary bin assembly to the final transport conveyor.

* * * * *